May 26, 1964  S. B. ARLINE ETAL  3,134,389
FLOW DIVERTER VALVE AND FLOW DIVERSION METHOD
Filed Aug. 4, 1961  2 Sheets-Sheet 1

INVENTORS
SAMUEL B. ARLINE
RUSSELL L. CARLSON
BY *Vernon F. Hauschild*
ATTORNEY

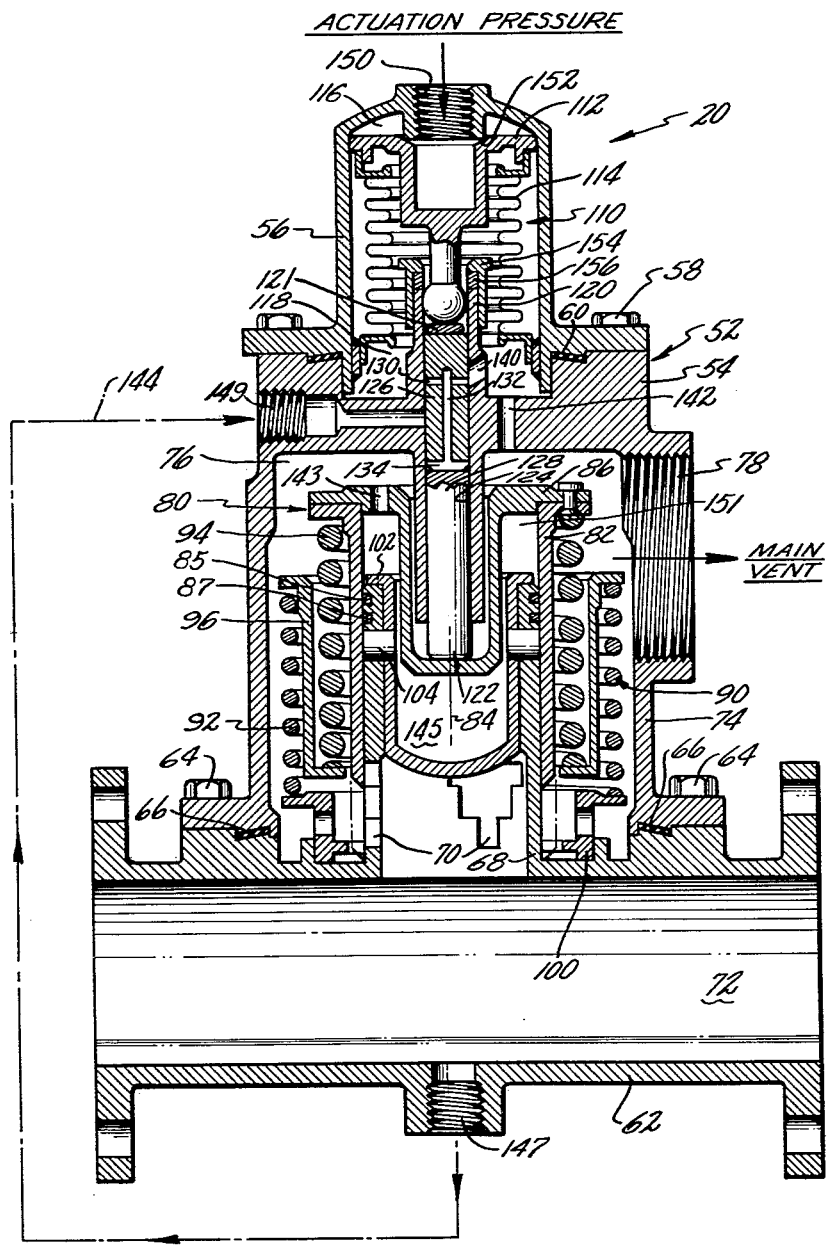

United States Patent Office 3,134,389
Patented May 26, 1964

3,134,389
FLOW DIVERTER VALVE AND FLOW
DIVERSION METHOD
Samuel B. Arline, Lake Park, and Russell L. Carlson,
Riviera Beach, Fla., assignors to United Aircraft Corporation, East Hartford, Conn., a corporation of Delaware
Filed Aug. 4, 1961, Ser. No. 129,379
5 Claims. (Cl. 137—14)

The invention described herein was made in the performance of work under a NASA contract and is subject to the provisions of the National Aeronautics and Space Act of 1958, Public Law 85–568 (72 Stat. 426; 42 U.S.C. 2451), as amended.

This invention relates to fluid flow diverter valves of the type commonly known as bleed valves and bypass valves.

It has been found that in certain systems, such as the propellant system of a cryogenic liquid rocket and the compressor of a turobjet engine, that it is necessary to bleed or bypass substantial quantities of fluid at a rapid rate and hence it is necessary to provide a flow diverting port or ports of substantial total area. For example, it is desirable to bleed propellant from a liquid rocket propellant conduit system during periods of propellant pump cool-down, during periods of pump acceleration, and also during or immediately after rocket engine shut-down. Similarly, it has been found desirable to bleed substantial quantities of air from the axial flow compressor of a turbojet engine during certain stages of engine operation to avoid compressor stall. While these are two illustrations of the purpose to which our flow diverter valve can be put, it will be apparent to one skilled in the art that it is equally applicable to any fluid flow system requiring rapid bleed or bypass.

While it is desirable to use the available fluid in the system to provide the actuating force to regulate the area of the flow diverting valve, it has been found that the size of the flow diverting ports required to effect rapid flow diversion prevents sufficient fluid pressure build-up to accomplish valve actuation. Accordingly, it is an object of this invention to teach a flow diverter valve and a flow diversion method wherein an independent fluid source is used to actuate the flow diverter valve toward its closed position during its initial stage of travel, thereby reducing the area of the flow diverter ports sufficiently to permit enough fluid pressure build-up of the fluid being diverted to power the flow diverter valve throughout the remainder of its valve closing operation. Further, a time interval may be obtained between the two steps of valve operation.

It is a further object of this invention to teach a flow diverter valve wherein the flow diverter port area and size is unlimited, wherein the valve travel is unlimited, and wherein the valve housing is fabricated such that the valve can be a one step valve, a two step valve or include as many steps as are found desirable.

Other objects and advantages will be apparent from the specification and claims and from the accompanying drawings which illustrate an embodiment of the invention.

FIGURE 3 is an enlarged cross-sectional showing of our fluid flow diverter valve.

As used herein, fluid flow diverter valve includes both bypass valves and bleed valves and is usable both with liquids, gases, and combination thereof. It will be recognized by those skilled in the art that the major distinction between a bleed valve and a bypass valve is that in the former the fluid which is diverted is discharged overboard or in some way out of the fluid conducting system whereas in the latter, it is reintroduced into the fluid conducting system for further use therein.

Figure 1:
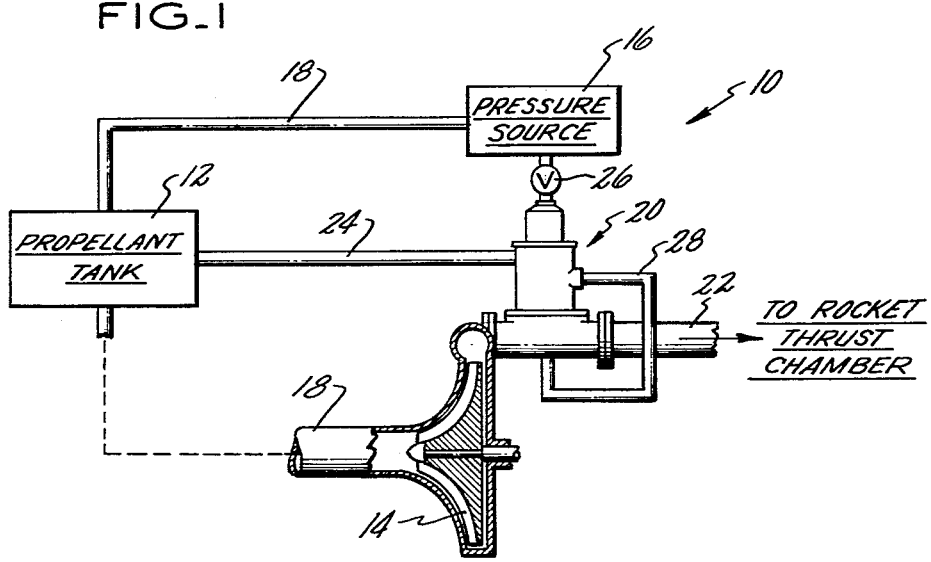
FIGURE 1 is a partial schematic showing of a liquid rocket propellant flow system utilizing our flow diverter valve.

Referring to FIG. 1, we see liquid rocket system 10, which includes, in part, propellant tank 12, turbine driven propellant pump 14, propellant pump pressurization source 16, connecting conduits 18, and our flow diverter valve 20. Pressurized source 16 serves to pressurize the propellant in tank 12 and provide such pressurized propellant to the turbine driven propellant pump 14 for distribution through conduit 22 to the rocket thrust chamber (not shown). During periods of propellant pump 14 cool down, pump 14 acceleration, and during or immediately after rocket engine 10 shut down it is desirable to remove the propellant from system 10 rapidly and in large quantities and this is the function of our flow diverter valve 20. Diverter valve 20 bleeds propellant from conduit 22 overboard or through bypass line 24 to propellant tank 12 as an illustration. Pressure source 16 or some other pressure source will serve to actuate our flow diverter valve during the initial portion of the valve closing operation, and may be regulated by pilot control valve 26, while propellant pump pressure from line 28 may be used to provide the actuating force during the remainder of valve 20 closing operation. This brief description of a rocket propellant system is considered sufficient to show and describe our flow diverter valve in such an environment and reference is hereby made to Rocket Propulsion Elements, by G. P. Sutton, published by John Wiley & Sons, New York, N.Y., 1956 for a more complete description of such a liquid rocket system.

Figure 2:
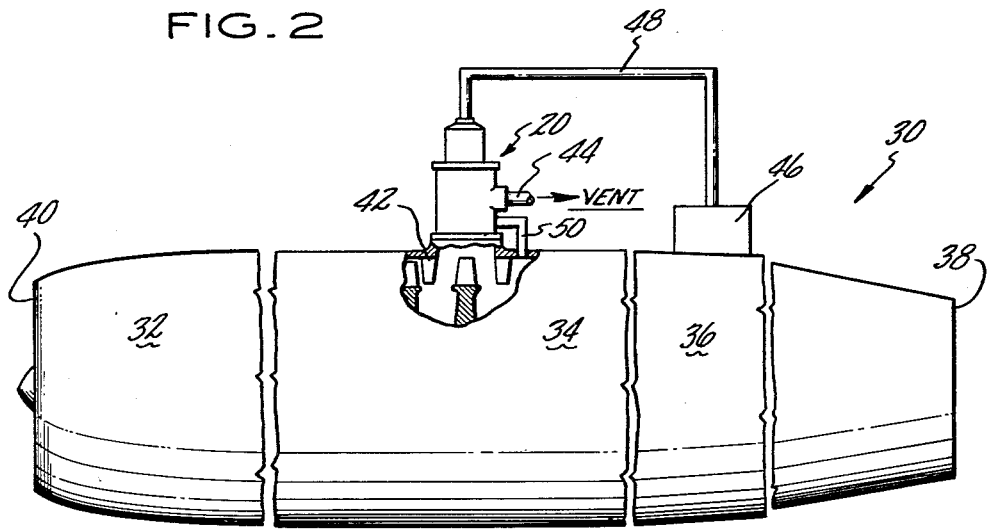
FIGURE 2 is a partial showing of a modern aircraft turbojet engine utilizing our flow diverter valve as a compressor bleed valve.

Referring to FIGURE 2, we see our flow diverter valve 20 used as a compressor bleed valve on a turbojet aircraft engine. Engine 30 includes compressor section 32, burner section 34, turbine section 36 and exhaust outlet 38. Air enters engine inlet 40, is compressed in passing through compressor section 32, is heated in passing through burner section 34, has sufficient energy extracted therefrom in passing through turbine section 36 to drive compressor 32 and is then discharged to atmosphere through exhaust outlet 38 to perform a thrust generating function. Flow diverter valve 20 is connected to the case 42 of compressor 32 and serves, when in its valve open position, to bleed compressor air from the interior of compressor 32 overboard or to some other part of the engine through vent 44. Pressure from an independent source such as lube pump 46 is provided through line 48 to valve 20 to power it through its initial valve closing motion, while compressor pressure is provided through line 50 to power valve 20 through the remainder of its valve closing operation. For a more complete description of the operation of a turbojet engine such as 30, reference is hereby made to U.S. Patent Nos. 2,711,631 and 2,747,367. The actuation and function of a compressor bleed is described more fully in U.S. Patent Nos. 2,732,125 and 2,930,520.

Referring to FIGURE 3, we see our flow diverter valve 20 shown in greater particularity. Valve 20 includes housing 52 which may be one piece but which preferably includes two pieces 54 and 56 joined by bolt means 58 and seal 60. Housing 52 may be integrally attached to main fuel flow line 62 but is preferably separate therefrom and attached thereto in flange fashion through bolts 64 and seals 66. Main fuel flow line 62 or valve housing 52 includes central member 68 which has one or more flow diverting ports 70 therein which communicate with the interior 72 of main fuel flow line 62 and are of selected area and shape so as to provide the necessary and desired flow diversion from the interior 72 of main line 62 when valve 20 is in its full open position or in some intermediate position. External member 74 surrounds central member 68 and cooperates therewith to define first compartment 76. Vent 78 joins compartment 76 with an overboard drain or some sort of a bypass return such that flow diverting port 70 serves to place the interior 72 of main fluid flow line 62 into communication with vent 78 through compartment 76. Moveable valve member or main piston 80 is positioned within cavity or compartment 76 and consists of sleeve member 82, which is sleeved over central member 68, with sealing rings 85 and 87 extending therebetween, and is moveable in translation along valve housing axis 84 to regulate the size of flow diverter ports 70. Sleeve member 82 connects to cross member 86 and moves therewith. Spring unit 90, which includes light spring 92 and heavy spring 94 connected through spring spacer and support 96, acts between ring member 100, which bears against either main line 62 or housing 54 and moveable member 80 so as to spring bias moveable member 80 to a valve full open position. Movement of sleeve 82 away from line 70 exposes flow diverter ports 70 until the maximum area of ports 70 is exposed.

Connecting member 102 extends across central member 68 and is connected thereto by rivets 104 to prevent communication therethrough between compartment 76 and main line interior 72. Moveable member 80 and central members 68 and 102 cooperate to form compartment 145 and compartment 151 which communicates with compartment 76 through weep hole 143 to equalize all fluid or gas forces acting parallel to housing axis 84 on moveable member 80.

Housing portion 56 defines auxiliary compartment 110 which receives auxiliary piston 112 which may reciprocate along axis 84. Piston 112 is connected to housing 56 through bellows or diaphragm 114, thereby dividing auxiliary compartment 110 into two compartments 116 and 118 sealed from each other by bellows or diaphragm 114.

Bore member 120 connects the first portion 118 of auxiliary compartment 110 with compartment 76. Three-piece piston unit 122 is slideably received in bore 124 of bore member 120 and includes shim 121, a ported top member 126 and bottom member 128. Top member 126 includes port 130 and axial bore 132 and cooperates with bottom member 128 to define actuating chamber 134. Three-piece piston unit 122 extends between the cross member 86 of the main piston 80 and the auxiliary piston 112. Weep holes 140 and 142 connect bore 124 to the first portion 118 of auxiliary compartment 110 and to compartment 76. Therefore, when porting 130 of piston member 122 is in the position shown in FIG. 3, bore 124 is in communication with the main compartment 76 and when porting 130 is in alignment with ducting 144, which joins the interior 72 of main fluid line 62 to bore 124, the fluid from interior 72 passes through connection 147 and ducting 144 into connection 149 and then into porting 130 and 132 and into actuating chamber 134. The pressurized fluid in chamber 134 forces portion 128 of piston unit 122 downwardly and thereby forces moveable member 80 downwardly to the eventual position shown in phantom in FIG. 3, to fully close flow diverter ports 70.

It has been found that when flow diverter ports 70 are made sufficiently large to accomplish the quick bleed or bypass function required of flow diverter valves in liquid rocket engines and turbojet engine compressors, the area of flow diverter ports 70 is so large that the pressure within interior 72 of main line 62 is unable to build-up sufficiently to provide adequate valve closing force. Accordingly, our housing includes inlet aperture 150 which permits an independent pressure source to enter portion 116 of auxiliary cavity or chamber 110 and thereby force auxiliary piston 112 downwardly toward line 72 until piston 112 contacts positive stop 154. Flow diverter ports 70 are partially closed by this downward movement of piston 112 since piston 112 is connected to moveable member 80 thru piston member 122 and hence member 80 moves downwardly therewith. The partial closure of ports 70 permits the pressure in conduit 70 to build up sufficiently so that it will be capable of regulating the area of ports 70. Slots 152 on auxiliary piston 112 permit independent pressure source to immediately act on the full diameter of auxiliary piston 112. Stop 154 is attached to bore member 120 and positioned with respect thereto by spacer ring 156. By varying thicknesses of shim 121 and spacer ring 156 either individually or in combination, many variations in moveable member 80 positioning are possible. Also, it will be noted that due to the sealable connection of bellows 114 between piston 112 and housing 56, the fluid which enters auxiliary chamber first portion 116 through inlet aperture 150 cannot seep therebeyond either into the second portion 118 of auxiliary chamber 110 or chamber 76. In view of this, there is no need to select the auxiliary fluid for chamber 116 such that it is compatible with the fluid in the main line 62. It is this downward move of auxiliary piston 112 which causes porting 130 to align with ducting 144 thereby partially closing flow diverter ports 70 and permitting pressure build-up within the interior 72 of main line 62 such that said increased pressure, acting through ducting 144 enters actuator chamber 134 to force the lower portion 128 of piston member 122 downwardly. Since piston portion 128 contacts cross member 86, downward movement of piston portion 128 moves across member 86 and sleeve 82 downwardly to close off flow diverter ports 70.

It will therefore be seen that flow diverter ports 70 are closed off in a two-step operation. With flow diverter ports in their fully open (FIG. 3) position, the initial portion or first step of the valve closing travel is brought about by the above described downward motion of auxiliary piston 112 which moves main piston 80 to an intermediate position wherein auxiliary piston 112 abuts bore member 124 and actuator chamber 134 aligns with conduit 144 to receive line 72 pressure therefrom. With this first step in closing ports 70 completed, the area thereof is reduced to an intermediate area and the amount of fluid being bled therethru from line 72 is accordingly reduced so that the pressure in line 72 will build up to a pressure where it may be the actuating force in the second step of valve closing and the remaining portion or the second step of the valve closing movement is brought about by the above described downward motion of the lower portion 128 of piston member 122 and hence sleeve 82.

Obviously, when the pressure is removed from compartments 76 and 116, spring unit 90 will force moveable valve member 80 upwardly to fully open ports 70. This can be accomplished rapidly and serves as a pressure relief valve for fluid pressure in main flow line 72.

It will be obvious to those skilled in the art that the pressure source which enters chamber portion 116 can be the same, or different from the fluid which enters from the source which enters compartment 76.

It is to be understood that the invention is not limited to the specific embodiment herein illustrated and described but may be used in other ways without departure from its spirit as defined by the following claims.

We claim:

1. A flow diverter valve comprising at least one fluid passage port of selected area adapted to communicate with a pressure regulated fluid, means moveable to regulate the area of said ports and to receive a first pressure to move said movable means through the initial part of its port area regulating movement only, and further to receive a second pressure to move said moveable means through the remainder of its port area regulating movement only.

2. Apparatus according to claim 1 wherein said first and second pressures are from independent fluid pressure sources and wherein said valve includes compartments to sealably separate the fluids of said first and second fluid pressure sources.

3. In a flow diverter valve, a housing (52) connected to a main fluid flow line (62) and including a central member (68) having at least one flow diverting port (70) of selected area therein and an external member (74) enveloping said central member to form a first compartment (76) therewith, a fluid vent aperture (78) in said external member so that said port establishes communication between said main line and said vent aperture through said first compartment, means (62 and 54) sealably connecting said central and said external members so that said port and said vent aperture constitute the sole flow openings in said first compartment, a main piston member (80) in said first compartment including a sleeve member (82) sleeved over said central member and moveable over said port to regulate port area and further including a cross-member (86) connected to said sleeve member, spring means (90) biasing said main piston in a direction to increase the area of said port, said housing also including at least one auxiliary compartment (110), an auxiliary piston (112) located in said auxiliary compartment and connected thereto by diaphragm means (114) to divide said auxiliary compartment into first (118) and second (116) portions, a fluid inlet aperture (150) in said housing communicating with said auxiliary compartment and located to contact said auxiliary piston to provide a first positive stop therefore, a bore member (124) connecting said first compartment to said auxiliary compartment first portion and providing a second positive stop for said auxiliary piston, conduit means (144) connecting the main line to said bore member, weep holes (140 and 142) connecting said bore member to said first compartment through said first portion of said auxiliary compartment, a two-piece moveable member (122) having a fluid actuator chamber (134) therebetween the separable pieces thereof slidably received in said bore member and contacting said cross member and said auxiliary piston and including passage means (130 and 132) which connect said actuator chamber to said weep holes when said two-piece moveable member is in a first position wherein said auxiliary piston is contacting said first positive stop at one end of its travel wherein said spring means may expand to force said main piston in a direction to increase the area of said diverting port to maximum and cause said two-piece moveable member to contract and extend between said auxiliary piston and said cross-member and which passage means connect said conduit means to said actuator chamber when said two-piece movable member is in a second position wherein said auxiliary piston is contacting said second positive stop wherein said main piston has been moved by said-two piece moveable means to an intermediate position to decrease the area of said diverting port to an intermediate area and so that said actuator chamber may receive fluid pressure from said conduit means to cause said members of said two-piece moveable member to separate and move said main piston to close off said diverting port.

4. Apparatus according to claim 3 wherein said housing is divided into two detachable parts with the first housing part defining said auxiliary compartment and with the second housing part housing said two-piece moveable member within said bore member and said main piston, and means detachably connecting said first and second housing parts so that said first housing part may be removed from said second housing part so that said conduit means may connect the main line to said two piece moveable member to provide a one step actuation.

5. The method of diverting large quantity flow from a fluid line comprising providing flow diverter ports of sufficient area in communication with the line to permit maximum diversion flow required therethru, and providing diverter port closing apparatus which is responsive to an independent pressure source to partially close the ports to permit fluid pressure build-up within the line so that the line fluid may thereafter be used as the motive force for the port closing apparatus to provide further port closing.

References Cited in the file of this patent
UNITED STATES PATENTS

| | | |
|---|---|---|
| 986,184 | Lilly | Mar. 7, 1911 |
| 1,892,565 | Browne | Dec. 27, 1932 |
| 1,925,301 | Campbell | Sept. 5, 1933 |
| 1,926,076 | Whalen | Sept. 12, 1933 |
| 2,619,109 | Garrett et al. | Nov. 25, 1952 |
| 2,642,254 | Armstrong | June 16, 1953 |

FOREIGN PATENTS

| | | |
|---|---|---|
| 483,835 | Great Britain | Apr. 27, 1938 |